United States Patent Office 3,467,755
Patented Sept. 16, 1969

3,467,755
COMPOSITIONS AND METHODS FOR PRODUCING SEDATION AND TRANQUILIZATION WITH SUBSTITUTED 4,5,6,7-TETRAHYDRO-4-OXINDOLES
Karl Schoen, Kew Gardens, and Irwin J. Pachter, Woodbury, N.Y., assignors to Endo Laboratories Inc., Garden City, N.Y., a corporation of New York
No Drawing. Continuation-in-part of application Ser. No. 348,878, Mar. 2, 1964. This application May 11, 1966, Ser. No. 549,135
Int. Cl. A61k 27/00; C07d 27/56
U.S. Cl. 424—274                13 Claims

ABSTRACT OF THE DISCLOSURE

Substituted 4,5,6,7-tetrahydro-4-oxoindoles are useful as psycho-therapeutic agents, in particular they reduce spontaneous motor activity, stimulate sensory perception, and have anti-depressant activity. Certain compounds also exhibit anti-inflammatory, antipyretic and analgetic activities.

---

This application is a continuation-in-part of Ser. No. 348,878, filed Mar. 2, 1964, and now abandoned.

This invention relates to valuable pharmaceuticals which are particularly useful as psychotherapeutic agents. Many of them are, in addition, outstandingly effective as anti-inflammatory, analgetic and antipyretic agents. More specifically, this invention is directed to such pharmaceuticals for use in mammals whereof the active substance is a 4,5,6,7-tetrahydro-4-oxoindole.

The active substances are compounds having the following structural formula:

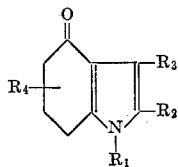

(A)

wherein:
$R_1$ designates hydrogen or a lower alkyl group of not more than 4 carbon atoms;
$R_2$ and $R_3$ designate hydrogen, halogen, an alkyl, cycloalkyl or alkenyl group of not more than 8 carbon atoms or benzyl;
$R_4$ designates hydrogen, a lower alkyl group of not more than 4 carbon atoms, benzyl or a gem-dialkyl function in which each alkyl group has no more than 2 carbon atoms; and
$R_1$ and $R_2$ may be connected to form a heterocyclic ring containing not more than 8 carbon atoms of the following structure (B) wherein $n$ is 1 to 4, and
$R_2$ and $R_3$ may be connected to form a carbocyclic ring containing not more than 8 carbon atoms of the following structure (C) wherein $n$ is 1 to 4.

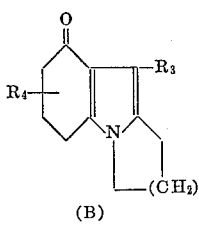
(B)

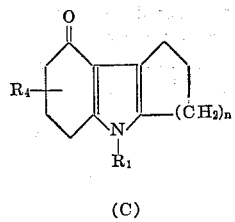
(C)

Most of the active substances of this invention are prepared by reducing α-oximinoketones (compounds having the following structure)

in the presence of cyclohexane-1,3-dione. Condensation occurs during the reduction process to provide the final products. The α-oximinoketone starting materials are either known to the art or may be readily prepared by nitrosation of appropriate ketones.

As an alternative route for the preparation of the compounds, one may use the method of Ann., 655, 20 (1962), in which ammonia or a primary amine is condensed with a derivative of 4,5,6,7-tetrahydro-4-oxobenzofuran. This method is predominantly of value when the end product sought is one wherein $R_1$ is an alkyl group.

The N-alkyl compounds may also be prepared from a 4,5,6,7-tetrahydro-4-oxoindole by treatment with an alkal metal which results in the formation of the alkali metal derivative; followed by the interaction of that alkali metal derivative with an N-alkylating agent such as alkyl halide or sulfate ($R_1X$, X designating the halogeno- or sulfato moiety) to produce the desired product.

The compounds may be prepared in accordance with the following reaction schemes (I), (II) or (III):

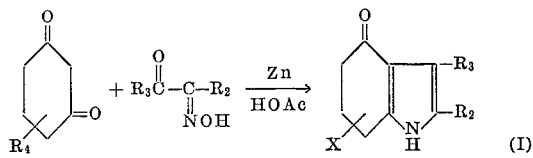
(I)

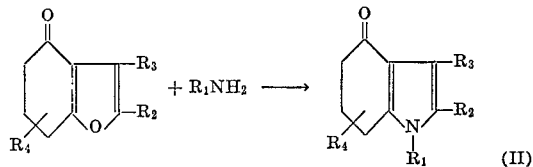
(II)

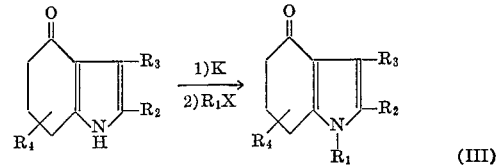
(III)

The symbols $R_1$, $R_2$, $R_3$, $R_4$ and X have the significance defined in Formula A, supra.

The substances of Formula A are noteworthy in that they provide, at suitable dosage levels, a variety of effects on the central nervous system. For instance, one effect is to produce sedation as evidenced by decrease in spontaneous motor activity. Thus, the 2-ethyl-4,5,6,7-tetrahydro-4-oxoindole is about 10 times as potent as meprobamate in producing such effect; 40 mg. of the 2-ethyl-4,5,6,7-tetrahydro-4-oxoindole produced the effect of 400 mg. of meprobamate. Another of the effects is the stimulation of sensory perception. Thus, 3-butyl-2-methyl-4,5,6,7-tetrahydro-4-oxoindole is about 0.5 times as potent as d-amphetamine in producing such effect; 20 mg. of 3-butyl-2-methyl-4,5,6,7-tetrahydro-4-oxoindole producing the effect of 10 mg. of d-amphetamine. Another effect is that of mood elevation in central nervous system depression, i.e., anti-depressant activity. Thus, the 3-ethyl-2-methyl-4,5,6,7-tetrahydro-4-oxoindole is twice as potent as imipramine in producing such effect; 25 mg. of 3-ethyl-2-methyl-4,5,6,7-tetrahydro-4-oxoindole producing the effect of 50 mg. of imipramine.

Many of the psychotherapeutic agents of this invention possess, in addition, valuable anti-inflammatory, analgetic and antipyretic properties. Particularly noteworthy in this regard is the group within the class of substances of Formula A wherein:

$R_1$ designates hydrogen; $R_2$ and $R_3$ designates hydrogen, an alkyl group of not more than four carbon atoms or an alkenyl group of not more than four carbon atoms; and $R_4$ designates hydrogen or methyl.

As in the case of all the known psychotherapeutic substances, dosages of the instant substances are individualizable on the basis of observations of the subject.

It also is to be noted that an effect of the types mentioned may be obtained by a mixture of two or more of the active substances of this family of 4,5,6,7-tetrahydro-4-oxoindoles; and the dosages of such mixtures individualized on the basis of the mentioned observation.

The activity of a psychotherapeutic substance of this invention, or mixtures thereof, can be ascertained by comparing the substance or mixtures thereof with a reference substance which produces one of the effects described, the comparison being made by any method known to workers in this art.

The active substances can be administered or used in a variety of ways. The oral route is preferred for administering the active substances, including distribution thereof in feeds, although rectal application in the form of conventional suppositories is also possible, as is parenteral administration in the form of aqueous or saline suspensions. The active substances may be used as pure compounds. Alternatively, the active substances can be distributed in or admixed with various pharmaceutical carriers. For example, starch, dry carriers such as sugar, talc and the like may be used to form powders. These powders can be used directly or inserted into gelatin capsules or tabletted. Suitable lubricants such as magnesium stearate, binders such as gelatin, and disintegrating agents such as sodium carbonate in combination with citric acid may be employed in the formation of tablets. The preferred physical structure of the compositions is dependent upon the physical properties of the active agent.

Unit dosage forms generally should contain a concentration of from 1% to 50%, by weight, of the active substance. Generally, such unit dosage forms contain about 5 to 500 mg. of the active substance.

The following are examples in accordance with this invention; the temperatures are in degrees centigrade:

EXAMPLE 1

Ethyl 4,5,6,7-tetrahydro-3-methyl-4-oxoindole-2-carboxylate

To a solution of 26 g. ethyl acetoacetate (0.2 mole) in 60 ml. glacial acetic acid cooled to 5° was added with efficient stirring a cold saturated aqueous solution of 13.8 g. sodium nitrite (0.2 mole) at such a rate that the temperature remained between 5–7°. After addition of the nitrite, the solution was stirred another 15 minutes; then a solution of 22.4 g. 1,3-cyclohexanedione (0.2 mole) in 70 ml. acetic acid was added. The cooling bath was removed and to the well stirred solution was added 26.1 g. zinc dust (0.4 gram-atom) at such a rate that the mixture came to boiling within 3 minutes and boiled actively until all the zinc had been added. The mixture was refluxed for 1 hour, then poured on 500 g. ice. A yellow precipitate formed which was filtered off, washed with water and crystallized repeatedly from ethanol. Yield, 14 g. pure product; M.P. 166–67°.

EXAMPLE 2

4,5,6,7-tetrahydro-3-methyl-4-oxoindole-2-carboxylic acid

Five g. of the ester of Example 1 was refluxed with a mixture of 20 ml. of 15% aqueous NaOH and 40 ml. ethanol for 45 minutes. The solution was brought to dryness in vacuo on a water bath, the residue taken up in water and acidified with 2 N HCl to Congo Red reaction. The free acid precipitated. It was filtered, washed with water and dried. For purification it was dissolved in 1 N NaOH and precipitated with HCl. On heating, the acid decomposes with gas formation at 265–66°, the temperature of decomposition depends on the rate of heating.

EXAMPLE 3

4,5,6,7-tetrahydro-3-methyl-4-oxoindole

Twelve grams of the acid of Example 2 was heated in a nitrogen atmosphere in an oil bath. At 250–255°, decarboxylation began and long colorless needles sublimed. The residue crystallized on cooling. It was recrystallized from ethanol and melts at 207–208°.

EXAMPLE 4

4,5,6,7-tetrahydro-2,3-dimethyl-4-oxoindole

To a well stirred solution of 22.4 g. 1,3-cyclohexanedione and 20.2 g. oximino methyl ethyl ketone in 250 ml. of 70% acetic acid was added 26.2 g. (0.4 gram-atom) zinc dust in small portions. The mixture came to boiling when about 80% of the zinc had been added. After complete addition, the mixture was refluxed for 45 minutes, then poured on 500 g. ice. The precipitate was filtered, washed with water, dried and crystallized from ethanol. M.P. 224–25°.

EXAMPLE 5

2-butyl-4,5,6,7-tetrahydro-3-methyl-4-oxoindole

This compound was prepared in accordance with the method described in Example 4 from 1,3-cyclohexanedione and 2-oxo-3-oximinoheptane; M.P. 164–65°.

EXAMPLE 6

4,5,6,7-tetrahydro-2-isopropyl-3-methyl-4-oxoindole

This compound was prepared in accordance with the method described in Example 4 from 1,3-cyclohexanedione and 2-methyl-3-oximino-4-oxopentane; M.P. 203.5–204.0°.

EXAMPLE 7

4,5,6,7-tetrahydro-3-methyl-2-(2-methylpropyl)-4-oxoindole

This compound was prepared in accordance with the method described in Example 4 from 1,3-cyclohexanedione and 2-methyl-4-oximino-5-oxohexane; M.P. 178–79°.

EXAMPLE 8

4,5,6,7-tetrahydro-3-methyl-2-ethyl-4-oxoindole

This compound was prepared in accordance with the method described in Example 4 from 1,3-cyclohexanedione and 3-oximino-2-oxopentane; M.P. 202–201.5°.

EXAMPLE 9

4,5,6,7-tetrahydro-2,3,6,6-tetramethyl-4-oxoindole

Dimedon (5,5-dimethyl-1,3-cyclohexanedione) 28 g. (0.2 mole) and 20.2 g. oximino-methyl ethyl ketone (0.2 mole) were dissolved in 250 ml. of 70% acetic acid and to the stirred solution was added 26.2 g. zinc duct (0.4 gram-atom) in portions in the course of 2 minutes. The mixture heated up but did not come to boiling. After addition of the zinc, the mixture was refluxed for 1 hour, then poured on 500 g. ice. A yellow solid separated which was purified by repeated crystallization from ethanol; M.P. 231–32°.

EXAMPLE 10

4,5,6,7-tetrahydro-2,3,6-trimethyl-4-oxoindole

This compound was prepared in accordance with the method described in Example 4 from 1-methyl-3,5-cyclohexanedione and oximino methyl ethyl ketone. It was crystallized from ethanol.

EXAMPLE 11

4,5,6,7-tetrahydro-2-methyl-3-(2-methylpropyl)-4-oxoindole

This compound was prepared in accordance with the method described in Example 4 from 1,3-cyclohexanedione and 5-methyl-2-oximino-3-hexanone. After crystallization from ethanol, it has M.P. of 180–182°.

EXAMPLE 12

2-ethyl-4,5,6,7-tetrahydro-4-oxo-3-propylindole

This compound was prepared in accordance with the method described in Example 4 from 1,3-cyclohexanedione and 3-oximino-4-heptanone. It was crystallized from ethanol and has M.P. 182°.

EXAMPLE 13

3-ethyl-4,5,6,7-tetrahydro-2-methyl-4-oxoindole

This compound was prepared in accordance with the method described in Example 4 from 1,3-cyclohexanedione and 2-oximino-3-oxopentane; M.P. 182–83°.

EXAMPLE 14

3-butyl-4,5,6,7-tetrahydro-2-methyl-4-oxoindole

This compound was prepared in accordance with the method described in Example 4 from 1,3-cyclohexanedione and 4-oximino-3-oxoheptane; M.P. 174–76°.

EXAMPLE 15

4,5,6,7-tetrahydro-3-isopropyl-2-methyl-4-oxoindole

This compound was prepared in accordance with the method described in Example 4 from 1,3-cyclohexanedione and 2-methyl-4-oximinopentane-3-one. After crystallization from ethanol, it has M.P. of 220.5–222.5°.

EXAMPLE 16

4,5,6,7-tetrahydro-2-methyl-4-oxo-3-propylindole 2-oximino-3-hexanone was prepared from 3-hexanone using the method of Ferris [J. Org. Chem. 24, 1726 (1959)]. Condensation with 1,3-cyclohexanedione according to Example 4 gave the title compound. M.P. 152°.

EXAMPLE 17

3-amyl-4,5,6,7-tetrahydro-2-methyl-4-oxoindole 2-oximino-3-octanone was prepared from 3-octanone according to the method of Ferris and reacted with 1,3-cyclohexanedione in accordance with the method described in Example 4. M.P. 133–134°.

EXAMPLE 18

3-hexyl-4,5,6,7-tetrahydro-2-methyl-4-oxoindole

This compound was prepared from 2-oximino-3-nonanone and 1,3-cyclohexanedione in accordance with the method described in Example 4. M.P. 122.5–124°.

EXAMPLE 19

1,2,3,4,5,6,7,8-octahydro-4-oxocarbazole

This compound was prepared in accordance with the method described in Example 4 from 1,3-cyclohexanedione and 2-oximinocyclohexanone; M.P. 225–6°.

EXAMPLE 20

2-bromo-4,5,6,7-tetrahydro-3-methyl-4-oxoindole

Fourteen and nine-tenths g. (0.1 mole) 4,5,6,7-tetrahydro-3-methyl-4-oxoindole (Example 3) was dissolved in 150 ml. glacial acetic acid and a solution of 16 g. (5.2 mol., 0.1 mole) bromine in 25 ml. glacial acetic acid added dropwise with stirring. The solution became hot spontaneously and after a few minutes a crystalline precipitate formed. Stirring was continued while the reaction flask was cooled with ice water. The precipitate was filtered off and washed with glacial acetic acid. It was a hydrobromide decomposing 110–120° without melting. The material was taken up in ethanol and water added. A slightly pink solid formed which was filtered off, dried and crystallized twice from ethanol. Pinkish crystals. On slow heating, they turn dark at 144° and decompose at 146°. Yield, 7 g.=31% of theory.

EXAMPLE 21

4,5,6,7-tetrahydro-1,2,3-trimethyl-4-oxoindole 32.6 g. (0.2 mole) of 4,5,6,7-tetrahydro-2,3-dimethyl-4-oxoindole (product of Example 4) and 7.8 g. (0.2 mole) of potassium metal were suspended in 500 ml. of anhydrous dioxane in a 3 neck round bottom flask provided with stirrer, condenser, and gas inlet tube. On stirring and warming to 60° in a nitrogen atmosphere, the oxoindole went into solution and simultaneously the potassium salt precipitated. The mixture was stirred for 30 minutes, cooled to room temperature, and 35.5 g. (0.25 mole) of iodomethane dissolved in 50 ml. of dioxane, was added dropwise. During the addition, the mixture warmed up spontaneously to 50°. After stirring for one hour, the precipitate of potassium iodide was filtered off, washed with 50 ml. of warm dioxane; and the combined dioxane solutions evaporated in vacuo. The residue was distilled at 160° under reduced pressure (3 mm. of mercury). The obtained 4,5,6,7-tetrahydro-1,2,3-trimethyl-4-oxoindole had a melting point of 85–88°.

EXAMPLE 22

1-butyl-3-ethyl-4,5,6,7-tetrahydro-2-methyl-4-oxoindole

This compound was prepared in accordance with the method described in Example 21 from 3-ethyl-4,5,6,7-tetrahydro-2-methyl-4-oxoindole (the product of Example 13), potassium and butyl bromide. It forms a pale yellow, viscous oil, B.P.$_2$ 166–167°, $n25.5_D$ 1.540.

EXAMPLE 23

3-ethyl-4,5,6,7-tetrahydro-1,2-dimethyl-4-oxoindole

This compound was prepared in accordance with the method described in Example 21 from 3-ethyl-4,5,6,7-tetrahydro-2-methyl-4-oxoindole, potassium and iodomethane.

EXAMPLE 24

3-cyclopropyl-4,5,6,7-tetrahydro-2-methyl-4-oxoindole 2-oximino-1-cyclopropyl-1-propanone was prepared from 1-cyclopropyl-1-propanone by the method of Ferris and reacted with 1,3-cyclohexanedione according to the method of Example 4.

EXAMPLE 25

Ethyl-3-ethyl-4,5,6,7-tetrahydro-4-oxoindole-2-carboxylate

This compound was prepared in accordance with the method described in Example 1 from ethyl propionylacetate and 1,3-cyclohexanedione. Its M.P. is 128–129°.

EXAMPLE 26

3-ethyl-4,5,6,7-tetrahydro-4-oxoindole-2-carboxylic acid

This compound was prepared from the foregoing ester produced in Example 25 by alkaline saponification in accordance with the method of Example 2. Its M.P. is 232.5–233° (decomposition).

EXAMPLE 27

3-ethyl-4,5,6,7-tetrahydro-4-oxoindole

The acid produced in Example 26 was heated in an oil bath to 230–240° until the evolution of gas was completed; the residue was crystallized from dioxane; M.P. 153.5–154.5°.

EXAMPLE 28

4,5,6,7-tetrahydro-4-oxo-3-propylindole

Ethyl 4,5,6,7-tetrahydro-4-oxo-3-propylindole - 2 - carboxylate, M.P. 165°, was prepared from ethyl butyrylacetate and 1,3-cyclohexanedione in accordance with the method of Example 1. It was saponified with NaOH, and acidified to yield the acid, M.P. 230° (decomposition); and the acid decarboxylated by heating in an oil bath at 230°. The compound was crystallized from toluene, M.P. 138–140°.

EXAMPLE 29

4,5,6,7-tetrahydro-3-isopropyl-4-oxoindole

This compound was prepared in accordance with the method of Example 2 by saponification of ethyl 4,5,6,7-tetrahydro-3-isopropyl-4-oxo-2-carboxylate (an oil which failed to crystallize) to produce the acid, M.P. 226° (decomposition). The acid was heated in an oil bath at 220–230°. The compound was re-crystallized from dioxane, M.P. 184–184.5°.

EXAMPLE 30

3-butyl-4,5,6,7-tetrahydro-4-oxoindole

This compound was prepared in accordance with the method in the foregoing examples from ethyl 3-butyl-4,5,6,7-tetrahydro-4-oxoindole-2-carboxylate (M.P. 122–122.5°) via the acid (M.P. 216° with decomposition). The compound was recrystallized from cyclohexane, M.P. 128–129°.

EXAMPLE 31

3-bromo-4,5,6,7-tetrahydro-2-methyl-4-oxoindole 4,5,6,7-tetrahydro-2-methyl-4-oxoindole, 14.9 g. (0.1 mole), was dissolved in 150 ml. acetic acid and a solution of 16 g. bromine (0.1 mole) in 50 ml. acetic acid was added dropwise with stirring at room temperature. The temperature rose to 38° and a light brown precipitate formed immediately. Stirring was continued for 20 minutes, the solid filtered off, washed with acetone and dried. It is a hydrobromide salt, M.P. 150–155° (decomposition). The yield was 27.5 g. When digested with water, the salt turned into a pink compound, M.P. 165–168°. After several crystallizations from isopropanol, the pure compound had an M.P. 178–180° (decomposition).

EXAMPLE 32

2-bromo-3-ethyl-4,5,6,7-tetrahydro-4-oxoindole

This compound was prepared in accordance with the method of Example 31 from 3-ethyl-4,5,6,7-tetrahydro-4-oxoindole and bromine. Its M.P. is 151–152°.

EXAMPLE 33

2-chloro-3-ethyl-4,5,6,7-tetrahydro-4-oxoindole

This compound was prepared from 3-ethyl-4,5,6,7-tetrahydro-4-oxoindole and sulfuryl chloride in anhydrous ether at 0°. It was crystallized from ethanol, M.P. 209° (decomposition).

EXAMPLE 34

2,3-dibromo-4,5,6,7-tetrahydro-4-oxoindole

This compound was prepared in accordance with the method of Example 31 from 4,5,6,7-tetrahydro-4-oxoindole and bromine; crystallized from dioxane, M.P. 150–153°.

EXAMPLE 35

2-allyl-4,5,6,7-tetrahydro-3-methyl-4-oxoindole

This compound was prepared in accordance with the method of Example 4 from 3-oximino-5-hexen-2-one and 1,3-cyclohexanedione, crystallized from isopropanol, M.P. 149–150° C.

EXAMPLE 36

4,5,6,7-tetrahydro-3-methyl-4-oxo-2-propylindole

This compound was prepared in accordance with the method of Example 4 from 3-oximino-2-hexanone and 1,3-cyclohexanedione; crystallized from toluene, M.P. 158–159.5°.

EXAMPLE 37

3-ethyl-4,5,6,7-tetrahydro-4-oxo-2-propylindole

This compound was prepared in accordance with the method of Example 4 from 4-oximino-3-heptanone and 1,3-cyclohexanedione; crystallized from toluene, M.P. 141–142.5°.

EXAMPLE 38

2-ethyl-4,5,6,7-tetrahydro-4-oxoindole 1,3-cyclohexanedione, 112 g. (1 mole), was dissolved in a solution of 56.1 g. of potassium hydroxide in 500 ml. methanol; and 151 g. of 1-bromo-2-butanone (1 mole), was added dropwise with stirring and cooling in an ice bath. After standing 48 hrs. at room temperature, the precipitated potassium bromide was filtered off; the filtrate made slightly alkaline, evaporated to dryness in vacuo; the residue taken up in water; and the alkaline solution extracted with ether in order to remove neutral material. The aqueous solution was then acidified with 2 N hydrochloric acid, giving 1-(2,6-dioxo-cyclohex-1-yl)-butan-2-one, M.P. 100–102°. 84 g. of this substance was added to 500 ml. of concentrated sulfuric acid with stirring. After 30 minutes the solution was poured on ice. The oil which separated, was extracted with ether, and the solvent removed. A yield of 35 g. of crude 2-ethyl-4,5,6,7-tetrahydro-4-oxo - benzofuran was obtained. The crude product was heated with 200 ml. of 11.4% ammonia in methanol in a pressure vessel to 150° for 40 hrs. After evaporation of the solvent, the residue was crystallized from ethanol, M.P. 147–148°, yield 15 g.

EXAMPLE 39

2-benzyl-4,5,6,7-tetrahydro-3-methyl-4-oxoindole

This compound was prepared in accordance with the method of Example 4 from oximino-benzylacetone and 1,3-cyclohexanedione. Crystallized from isopropanol, M.P. 193–194°.

EXAMPLE 40

3-benzyl-4,5,6,7-tetrahydro-4-oxoindole

Methyl 3 - benzyl-4,5,6,7-tetrahydro-4-oxoindole-2-carboxylate was prepared in accordance with the method of Example 1 from methyl γ-phenylacetoacetate and 1,3-cyclohexanedione, M.P. 177–177.5°. The ester was subjected to alkaline saponification, and the free acid then obtained, M.P. 224° (decomposition). Heating of the acid to 220–230° in an oil bath gave the compound, M.P. 190–191°.

EXAMPLE 41

4,5,6,7-tetrahydro-2,6,6-trimethyl-4-oxo-3-propylindole

This compound was prepared in accordance with the method of Example 4 from 2-oximino-3-hexanone, and 5,5 - dimethyl - 1,3 - cyclohexanedione. Crystallized from toluene, M.P. 201–204°.

EXAMPLE 42

4,5,6,7-tetrahydro-2,6-dimethyl-4-oxo-3-propylindole

This compound was prepared in accordance with the method of Example 4 from 2-oximino-3-hexanone and 5-methyl-1,3-cyclohexanedione. Crystallized from ethanol, M.P. 205–208°.

EXAMPLE 43

3-ethyl-4,5,6,7-tetrahydro-6-methyl-4-oxoindole

Ethyl 3 - ethyl - 4,5,6,7 - tetrahydro-6-methyl-4-oxoindole-2-carboxylate (M.P. 155–155.5°) was prepared in accordance with the method of Example 1 from ethyl propionylacetate and 5 - methyl - 1,3 - cyclohexanedione. Saponification, followed by acidification, gave the acid, M.P. 244–246° (decomposition) and decarboxylation of the latter gave the product, M.P. 181–182°.

EXAMPLE 44

4,5,6,7-tetrahydro-6-methyl-4-oxo-3-propylindole

This compound was prepared from ethyl 4,5,6,7-tetrahydro - 6 - methyl - 4 - oxo-3-propylindole-2-carboxylate (M.P. 161–162°) by saponification followed by acidification to yield the acid, (M.P. 235°, decomposition) and decarboxylation. Crystallized from ethanol, M.P. 174–175°.

EXAMPLE 45

6-benzyl-4,5,6,7-tetrahydro-2,3-dimethyl-4-oxoindole

This compound was prepared in accordance with the method of Example 4 from 5-benzyl-1,3-cyclohexanedione and butane-2,3-dione monoxime. Crystallized from isopropanol, M.P. 228–229°.

EXAMPLE 46

4,5,6,7-tetrahydro-2,3,5-trimethyl-4-oxoindole 4,5,6,7 - tetrahydro-2,3-dimethyl-4-oxoindole (product of Example 4); 16.3 gm. (0.10 mole); 8.15 gm. dimethylamine hydrochloride (0.10 mole), and 4.5 gm. paraformaldehyde (0.15 mole) were refluxed in 250 ml. ethanol. After 8 hours, added 1 gm. of paraformaldehyde and after 24 hours another 1 gm. After refluxing for a total of 48 hours, 120 ml. ethanol were distilled off. On standing at room temperature over night, colorless needles crystallized to a constant melting point of 230° from 90% aqueous ethanol.

The 5 - dimethylaminomethyl-4,5,6,7-tetrahydro-2,3-dimethyl-4-oxoindole (M.P. 166°) thus obtained, 51 g. was dissolved in 350 ml. isopropanal and methyl bromide gas bubbled through. Within a few minutes, the methobromide crystallized. It was purified by recrystallization from a mixture of methanol and ethanol, M.P. 2220°.

The methobromide was dissolved in 80% aqueous ethanol and hydrogenated in a Parr apparatus with palladium on charcoal catalyst. The catalyst was removed; the solution evaporated to dryness under reduced pressure; the residue treated with water in order to dissolve the trimethylammonium bromide, and the insoluble material crystallized from isopropanol, M.P. 222–223°.

EXAMPLE 47

4,5,6,7-tetrahydro-2,5-dimethyl-4-oxo-3-propylindole

5 - dimethylaminomethyl-4,5,6,7-tetrahydro-2-methyl-4-oxo-3-propylindole, M.P. 148°, was prepared from 4,5,6,7,-tetrahydro-2-methyl-4-oxo-3-propylindole (product of Example 16), by the procedure of Example 46. It was converted into the methobromide salt, M.P. 221–222°. Reduction of the latter with hydrogen in the presence of palladium on charcoal yielded the compound of this example, M.P. 185°.

EXAMPLE 48

4,5,6,7-tetrahydro-3,5-dimethyl-4-oxoindole

Ethyl 4,5,6,7 - tetrahydro-3-methyl-4-oxoindole-2-carboxylate (product of Example 1), was transformed into the Mannich base, 5-dimethylaminoethyl-4,5,6,7-tetrahydro - 3,5 - dimethyl-4-oxoindole-2-carboxylate (M.P. 138–139.5°) by refluxing with dimethylamine hydrochloride and paraformaldehyde in ethanol solution. The methobromide (M.P. 214–215°) was prepared as described in Example 46. Hydrogenation with palladium on charcoal in 80% ethanol solution yielded ethyl 4,5,6,7-tetrahydro-3,5-dimethyl-4-oxoindole-2-carboxylate, M.P. 147–148°. Saponification with 1 N aqueous NaOH, followed by acidification, gave the free acid, M.P. 234–236° (decomposition); and the latter on heating in an oil bath to 230– 240° in a nitrogen atmosphere gave the product of this example; crystallized from toluene, M.P. 173–173.5°.

EXAMPLE 49

1,2,3,4,5,6,7,8,9,10-decahydro-1-oxocyclohept[b] indole

This compound was prepared in accordance with the method of Example 4 from 2-oximino-1-cycloheptanone and 1,3-cyclohexanedione. On crystallization from aqueous ethanol, it had a M.P. of 214°.

EXAMPLE 50

2-butyl-4,5,6,7-tetrahydro-4-oxoindole

The reaction of butyl chloromethyl ketone with the sodium salt of 1,3-cyclohexanedione in accordance with the method of Example 38 gave 2-(2-ketohexyl)-1,3-cyclohexanedione, an oil which crystallizes when kept in the refrigerator. Dehydration and ring closure in concentrated sulfuric acid gave 2-butyl-4,5,6,7-tetrahydro-4-oxobenzofuran, a pale yellow, mobile oil of fragrant odor B.P./0.2 mm. 105–107°. Heating of the latter compound is methanolic ammonia under pressure to 140° gave the indole derivative.

EXAMPLE 51

Ingredient: Mg. tablet
3 - ethyl-5,6,7,8-tetrahydro-2-methyl - 4 - oxoindole _____ 20
Lactose USP (spray dried) _____ 170
Starch USP _____ 10
Magnesium stearate USP _____ 1
Stearic acid USP _____ 5
Flavor _____ q.s.

All above ingredients were passed through 60-mesh sieve, blended for 30 minutes and compressed directly into tablets on a suitable tablet press at a weight of 206 mg., using a ¹¹⁄₃₂″ biconcave, scored punch.

EXAMPLE 52

Ingredient: Mg. tablet
5,6,7,8-tetrahydro-3-methyl-4-oxoindole _____ 250
Lactose USP (impalpable) _____ 60
Starch USP _____ 140
Magnesium stearate USP _____ 3
Stearic acid USP _____ 10
Flavor _____ q.s.

These ingredients were granulated with starch paste according to the method known to the art. They were dried, passed through a No. 20 mesh sieve and compressed on a suitable tablet press, using a ¹⁴⁄₃₂″ biconcave punch at a weight of 463 mg.

EXAMPLE 53

Ingredient: Mg. capsule
5,6,7,8 - tetrahydro - 2 - methyl - 3 - butyl - 4-oxoindole _____ 20
Lactose USP _____ 100
Magnesium stearate _____ 1
Cab-o-Sil (amorphous silicon dioxide) _____ 5

These ingredients were combined, blended and passed through a No. 1 screen of Fitzpatrick comminutor machine before encapsulating into a two-piece hard gelatin No. 3 capsule on a standard capsulating machine at a net weight of 126 mg. net weight.

EXAMPLE 54

Ingredient: Mg. capsule
2-ethyl-5,6,7,8-tetrahydro-4-oxoindole _____ 150
Lactose USP _____ 200
Magnesium stearate _____ 1
Cab-o-Sil (amorphous silicon dioxide) _____ 5

These ingredients were combined, blended and passed through a No. 1 screen of Fitzpatrick comminutor machine before encapsulating with two-piece hard gelatin No. 0 capsules on a standard capsulating machine at 356 mg. net weight.

EXAMPLE 55

| Ingredient: | Mg. suppository |
|---|---|
| 2 - allyl - 4,5,6,7 - tetrahydro - 3 - methyl - 4-oxoindole | 200 |
| Cocoa butter | q.s. |

The drug and cocoa butter are combined, mixed thoroughly and formed into 2 gram suppositories.

We claim:

1. Method of producing sedation and tranquilization in mammals which comprises administering to a mammal an effective amount of a compound having the formula:

wherein:

$R_1$ designates hydrogen or a lower alkyl group of not more than 4 carbon atoms;

$R_2$ and $R_3$ designate hydrogen, halogen, an alkyl, cycloalkyl or alkenyl group of not more than 8 carbon atoms or benzyl;

$R_4$ designates hydrogen, a lower alkyl group of not more than 4 carbon atoms, benzyl or a gem-dialkyl function in which each alkyl group has no more than 2 carbon atoms.

2. Method in accordance with claim 1, wherein the compound is 3 - ethyl-4,5,6,7-tetrahydro-2-methyl-4-oxoindole.

3. Method in accordance with claim 1, wherein the compound is 4,5,6,7-tetrahydro-3-methyl-4-oxoindole.

4. Method in accordance with claim 1, which comprises effecting sedation by administering an effective amount of a compound as defined in claim 1.

5. Method in accordance with claim 1, wherein compound A is 2-ethyl-4,5,6,7-tetrahydro-4-oxoindole.

6. Method in accordance with claim 1, wherein compound A is 3-butyl-4,5,6,7-tetrahydro-2-methyl-4-oxoindole.

7. Method in accordance with claim 1, wherein compound A is 2 - allyl-4,5,6,7-tetrahydro-3-methyl-4-oxoindole.

8. A therapeutic composition in the form of a capsule, tablet or suppository, comprising an effective amount of a compound having the formula:

wherein:

$R_1$ designates hydrogen or a lower alkyl group of not more than 4 carbon atoms;

$R_2$ and $R_3$ designate hydrogen, halogen, an alkyl, cycloalkyl or alkenyl group of not more than 8 carbon atoms, or benzyl;

$R_4$ designates hydrogen, a lower alkyl group of not more than 4 carbon atoms, benzyl or a gem-dialkyl function in which each alkyl group has no more than 2 carbon atoms, and a pharmaceutically acceptable carrier therefor.

9. The therapeutic composition of claim 8, wherein the compound is 3-ethyl-4,5,6,7-tetrahydro-2-methyl-4-oxoindole.

10. The therapeutic composition of claim 8, wherein the compound is 4,5,6,7-tetrahydro-3-methyl-4-oxoindole.

11. The therapeutic composition of claim 8, wherein the compound is 2-ethyl-4,5,6,7-tetrahydro-4-oxoindole.

12. The therapeutic composition of claim 8, wherein the compound is 3-butyl-4,5,6,7-tetrahydro-2-methyl-4-oxoindole.

13. The therapeutic compostion of claim 8, wherein the compound is 2-allyl-4,5,6,7-tetrahydro-3-methyl-4-oxoindole.

References Cited

Stetter H., Chem. Abst. 57, pp. 15056–15057 (1962).

ALBERT T. MEYERS, Primary Examiner

S. J. FRIEDMAN, Assistant Examiner

U.S. Cl. X.R.

260—326.18